Oct. 31, 1967      R. E. STARK      3,350,198
CADMIUM METAL SPONGE
Original Filed Jan. 6, 1964
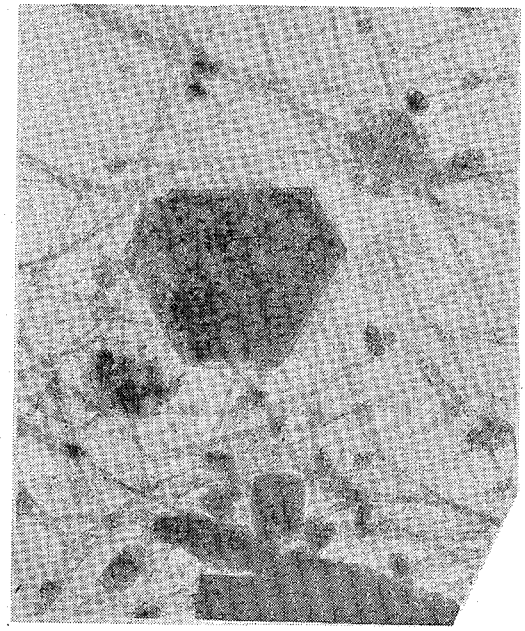
INVENTOR.
ROBERT E. STARK
BY
ATTORNEY 3,350,198
CADMIUM METAL SPONGE
Robert E. Stark, Avon Lake, Ohio, assignor to Union
Carbide Corporation, a corporation of New York
Original application Jan. 6, 1964, Ser. No. 335,798, now
Patent No. 3,297,433, dated Jan. 10, 1967. Divided and
this application Dec. 19, 1966, Ser. No. 620,199
1 Claim. (Cl. 75—151)

This is a division of application Ser. No. 335,798, filed Jan. 6, 1964, now Patent No. 3,297,433.

This invention relates to a cadmium metal sponge for use in the fabrication of high efficiency, high current density cadmium electrodes for electrical storage devices such as alkaline primary and secondary batteries, capacitors and the like.

Cadmium electrodes for use in alkaline secondary batteries are normally fabricated and assembled in the battery in the uncharged state, i.e., in the form of cadmium oxide or hydroxide. The batteries are then subjected to a formation process which activates the electrodes and provides charged batteries.

The formation process consists of alternately charging and discharging the assembled cell in an excess of electrolyte, e.g., potassium hydroxide. The electrolyte must be periodically replaced in order to prevent the carbon dioxide content from reaching undesirable levels. The charge-discharge cycle is repeated several times in order to place the electrodes in a condition in which the cell will operate with a reasonable efficiency at a high rate of discharge. In secondary cells which are intended for sealed operation, the process of formation must be carried out prior to closure of the cell, thereby complicating the assembly process.

To provide high current density and high efficiency the electrode must have an exposed cadmium surface area which is as large as possible. The cadmium metal powder currently commercially available does not have a satisfactory surface area to weight ratio.

During the course of experimentation leading to the present invention, finely-divided cadmium sponge was produced which can be dried safely without danger of spontaneous combustion upon exposure to air and which can be compressed into any desired electrode shape.

It is an object of the instant invention to provide high surface area cadmium metal sponge.

It is another object to provide a high efficiency, high current density cadmium electrode prepared from a specially prepared cadmium metal sponge.

Broadly, the present invention contemplates the preparation of a particular form of cadmium metal particles through the reduction of cadmium containing compounds in an electrolyte solution.

The term "reduction" is used in a broad sense and indicates a gain of electrons by a metal species through a chemical or electrochemical reaction.

The sole figure in the accompanying drawing is a photomicrograph of cadmium metal sponge produced in accordance with the invention showing both plate-like and acicula crystals under a linear magnification of 60,000.

The reaction between the cadmium compound and the cadmium replacing metal is carried out in an aqueous electrolyte solution, preferably an alkaline solution, e.g., potassium hydroxide and/or sodium hydroxide, ranging in concentration from about 0.001 "normal" to about 14.5 "normal." The term "normal" as used herein refers to the concentration of alkali in gram equivalents per liter of solution. It has been found that extremely high or low concentrations tend to slow down the reaction. Consequently, a suitable range is from about 6 to about 13 normal.

The reaction can be carried out as either one step or a multi-step process. For example, the admixture of cadmium compound and cadmium replacing metal can be added to an alkali solution having a normality within the preferred range. Alternatively, the admixture can be added to a dilute alkali solution, e.g., 0.01 normal. When the initial evolution of hydrogen gas is over, the partially reacted material can be recovered and then contacted with a more concentrated solution of alkali, e.g., 6 to 13 normal.

Cadmium compounds which are suitable for use in the present invention include cadmium oxide, cadmium hydroxide, cadmium acetate, cadmium carbonate, cadmium chloride, cadmium chlorate, cadmium sulfate, cadmium nitrate, and the like. Preferred compounds are the oxide, hydroxide, and acetate of cadmium.

The reduction of the cadmium compound can be accomplished by means of a finely divided metal reducing agent. The metals which may be used to reduce the cadmium compound are those metals which are placed above cadmium in the electromotive series and thus will displace cadmium from a cadmium salt solution. The electromotive series is a list of metals arranged in the decreasing order of the metals tendency to pass into ionic form by losing electrons. Suitable metals include aluminum, zinc and the like. Alloys of these metals are also suitable for use as herein described. Such metals and their alloys are conveniently referred to as "cadmium replacing metals."

The ratio of cadmium compound to cadmium replacing metal is not narrowly critical and can be conveniently adjusted within certain limits to optimize the yield of cadmium metal. Since the process is not 100 percent efficient, due to competing reactions, an excess of cadmium reducing metal, over and above the amount theoretically necessary, is desirable. This amount of cadmium replacing metal can conveniently be referred to as a "replacing amount." The term "replacing amount" means that amount which is sufficient to provide for the conversion of all the cadmium oxide present to cadmium metal, under the prevailing reaction conditions. This "replacing amount" will always be an amount which is in excess of the theoretical amount needed to reduce the desired amount of the cadmium oxide, e.g., in excess of the stoichiometric amount as illustrated by the equation $$3CdO + 2Al + 2KOH$$
$$3Cd + 2KAlO_2 + H_2O$$

The term "less than a replacing amount" is intended to mean an amount which is sufficient to provide for the conversion to cadmium of some predetermined portion of the total amount of cadmium oxide present. It will be apparent that the stoichiometric amount according to the above equation is less than "a replacing amount." Satisfactory results have been obtained using a 20 percent excess over and above that amount which is necessary to reduce all the cadmium compound to cadmium metal. For charged electrodes, the cadmium sponge desirably has some residual cadmium oxide to provide overcharge protection. This can be accomplished by using less than the amount of cadmium replacing metal needed to react with all the cadmium oxide, thereby leaving some of the cadmium oxide starting material unreduced. For example, a mixture containing 89 percent by weight cadmium oxide and 11 percent by weight aluminum can be reacted to provide for the reduction of about 70 percent of the initial amount of cadmium oxide. By providing a mixture containing 20 weight percent aluminum and 80 weight percent cadmium oxide substantially all the cadmium oxide can be reduced to cadmium metal.

The reaction between the cadmium compound and the cadmium replacing metal is quite rapid, particularly at elevated temperatures and is accompanied by an initial copious evolution of hydrogen gas. In general, sufficient reaction time should be provided to allow for the complete utilization of substantially all the cadmium replacing metal in the initial admixture. The term "utilization" is not limited to the reaction between the cadmium compound and the cadmium replacing metal, but is intended to include the reaction of the cadmium replacing metal with the alkali metal hydroxide or any other reactive material.

During the reaction, the solution is preferably maintained at a temperature between about 20° C. and the boiling point of the solution. Temperatures less than 20° C. are operative. The rate of reaction has been found to be, at least in part, dependent on temperature. Control over the temperature of the reaction solution therefore provides a convenient means of providing modifications of the process. For example, instead of using an initial solution of low concentration, to avoid an initial violent evolution of hydrogen gas, and then transferring the partially reacted material to a more concentrated solution for complete reaction, it may be found convenient to employ a single solution of substantial concentration which is initially maintained at a low temperature, e.g., 10° C. When the initial copious evolution of gas is over, the temperature can be raised by means of external heat or the heat of reaction can be utilized.

In the practice of the invention the cadmium compound, e.g., cadmium oxide, and the cadmium replacing metal are blended to form an intimate admixture. This admixture is then fed into a reaction vessel containing an aqueous electrolyte solution, e.g., 12 normal potassium hydroxide. It is desirable to provide a smooth flow of reactants into the alkaline solution. For this purpose a vibrating screeen may conveniently be employed. The temperature of the alkaline solution can be maintained at the desired level during the reaction by circulating the solution through a heat exchanger. When the reaction is complete, i.e., when the cadmium is in the form of a finely-divided metal powder the used alkali is pumped from the reaction vessel and the powdered cadmium is recovered, e.g., by filtration. The residual alkali can be conveniently removed by washing the cadmium powder with a 5 percent boric acid solution and then with water until the wash water is neutral, i.e., a pH of about 7. The cadmium powder can be compressed into the wafers or pellets and dried at an elevated temperature, e.g., 110° C. The drying steps may be carried out in an inert atmosphere if desired. If the cadmium powder is substantially free of residual alkali, an inert atmosphere is not necessary. The dried wafers or pellets can then be pulverized, as needed, to the desired agglomerate particle size and molded into charged cadmium electrodes for use in alkaline cells.

Cadmium sponge prepared by the method herein described can be dried by a variety of techniques. The sponge can be compression molded to the form of small disks and dried at a temperature of about 90° C. to 100° C. Prior to drying, the disks or pellets must be stored in an inert environment to prevent re-oxidation of the cadmium metal. The dry pellets can easily be pulverized and ground to a fine powder and then stored in sealed containers.

Alternatively, the cadmium sponge can be spray dried by conventional techniques and again stored in sealed containers till used for fabrication of electrodes.

The sponge cadmium metal produced by the herein described process is ideally suited by reason of its particle size, shape, and stability for incorporation into grid structures, either alone or in combination with other materials, as a charged negative electrode or as the antipolar mass in an uncharged positive electrode for nickel cadmium cells. The cadmium sponge can be coherently compacted under pressure without excessive cold welding and loss of interior cadmium surface. It is believed that the acicular crystals in random orientation are helpful in maintaining an interlocked but open structure under presssure. The plate shaped crystals add compression strength and provide desirable active surface area for electrochemical action.

The process for manufacturing high surface area cadmium metal as described herein is conveniently adaptable to continuous, semi-continuous, and batch wise procedures.

Inasmuch as cadmium electrodes desirably contain some cadmium oxide, the conversion of cadmium oxide to cadmium may be held to a predetermined limit in order to provide adequate overcharge protection in the cell, by simply adjusting the ratio of cadmium compound to cadmium replacing metal.

The cadmium metal sponge produced by the herein described process has been found to contain two distinct crystal shapes, both of which are predominantly cadmium as determined by X-ray diffraction data. One crystal is plate-like, the other is fibrous or acicular as substantially shown in the drawing. Both the size and the shape of the cadmium particles differ from the starting material, i.e., cadmium oxide, and are unlike the crystal shape normally associated with commercially available cadmium powders.

The high surface area cadmium metal produced by the herein described process is ideally suited for use in electrochemical devices inasmuch as it has a high surface area per unit of weight, having a surface area of from about 1.5 to about 2.5 square meters per gram, as measured by low temperature absorption of krypton.

The surface area of fine particles can be accurately determined by measuring the adsorption of a gas such as nitrogen or krypton according to the method of Brunauer, Emmett and Teller, American Chemical Society Journal 59:1553 (1937), 60:309 (1938), and The Adsorption of Gases and Vapors, vol. 1, by S. Brunauer, University Press, Princeton, N.J., 1945. Samples of powdered cadmium made according to the present process were found to have bulk density of 120 pounds per cubic foot, as compared to a bulk density of 227 pounds per cubic foot for a sample of commercially available cadmium powder. The bulk density was measured by the method designated as A.S.T.M. B212–48.

*Example I*

Five pounds of an admixture of cadmium oxide and aluminum powder in a weight ratio of 384 grams of cadmium oxide to 54 grams of aluminum was sifted through a vibrating screen at the rate of 2½ pounds per hour into 35 gallons of 12 normal potassium hydroxide at a temperature of 100° C. The reaction time allowed for the last addition was approximately 5 minutes, after which the product was washed free of residual potassium hydroxide. The product was found to contain from 85 to 86 weight percent cadmium and from 10 to 12 weight percent cadmium oxide. The cadmium metal had a surface area of approximately 1.6 square meters per gram as measured by the low temperature adsorption of krypton.

*Example II*

An admixture comprising 5,789 grams of cadmium oxide and 1,021 grams of aluminum powder was intimately blended and then added to a vessel containing 4 gallons of a 30 weight percent aqueous solution of potassium hydroxide in the following manner. One pound of the admixture was slowly sifted onto the surface of the potassium hydroxide solution and allowed to react on the solution surface till evolution of hydrogen ceased. Then the cadmium sponge which had been formed on the surface was dispersed and allowed to settle. Successive additions of the cadmium oxide-aluminum admixture were sifted onto the solution surface and reacted in the same manner. When all of the admixture was reacted to form cadmium sponge the supernatant solution was removed by decantation.

The cadmium sponge was then washed with water in a washing tower by adding one pound of sponge to the top of the tower. When the sponge passed the first baffle plate, another pound of cadmium sponge was added through the top of the tower. During this washing operation the water input volume was adjusted to equal the output volume. Washing was continued until the pH of the effluent from the cadmium sponge was neutral, i.e., about 7.0. The washed sponge was then removed from the bottom of the tower and dried.

The cadmium sponge was found to contain 8–10 weight percent cadmium oxide and 75–85 weight percent cadmium metal in addition to aluminate salts. The aluminate salts are a mixture of aluminum hydroxide, insoluble alkaline earth hydroxides, and alkali metal and alkaline earth metal aluminates. The cadmium sponge had a surface area of 1.5–2.0 square meters per gram as measured by krypton adsorption technique.

*Example III*

Two charged cadmium electrodes were molded under a pressure of 5 tons per square inch from a mixture comprising 80 weight percent cadmium sponge made by the present process and 20 weight percent graphite. The cadmium sponge was approximately 85 weight percent cadmium metal. On discharge the efficiency based on the weight of cadmium metal per electrode was approximately 72 to 75 percent at a discharge current of 110 milliamperes per square inch and a capacity factor of approximately 8.0 ampere hours per cubic inch. In comparison, electrodes containing 80 weight percent commercially procured cadmium powder and 20 weight percent graphite were molded and discharged under identical conditions. This cadmium contained about 93 weight percent cadmium metal. These electrodes had an efficiency of 14 percent based on the weight of cadmium metal per electrode.

The efficiency is determined from the ratio of the actual number of ampere-hours delivered per cubic inch of electrode material to the theoretical number of ampere-hours available based on the weight of active material per cubic inch.

High surface area cadmium sponge is useful in the manufacture of cadmium electrodes for use in electrical storage devices such as capacitors, silver-cadmium, and nickel-cadmium secondary batteries and in primary batteries using cadmium electrodes.

What is claimed is:

A cadmium metal sponge characterized by high surface area and having both plate-like and acicular shaped crystals, substantially as shown in the accompanying drawing.

References Cited

UNITED STATES PATENTS

| | | | |
|---|---|---|---|
| 1,644,431 | 10/1927 | Howard | 75—71 |
| 2,074,806 | 3/1937 | Por | 75—71 |
| 2,178,763 | 11/1939 | O'Brien | 75—71 |
| 2,790,733 | 4/1957 | Couch | 75—.5 |
| 3,248,212 | 4/1966 | Mellgren et al. | 75—71 |

DAVID L. RECK, *Primary Examiner.*

RICHARD O. DEAN, *Examiner.*